April 8, 1952 A. R. FULTZ 2,592,264
CONTOUR PROJECTOR
Filed April 8, 1950 3 Sheets-Sheet 2
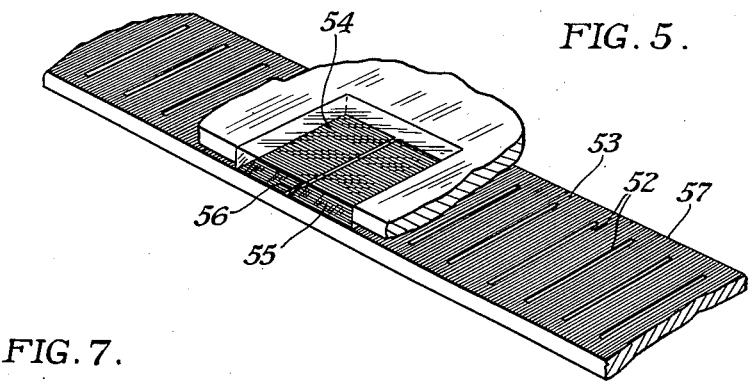
FIG. 5.
FIG. 7.
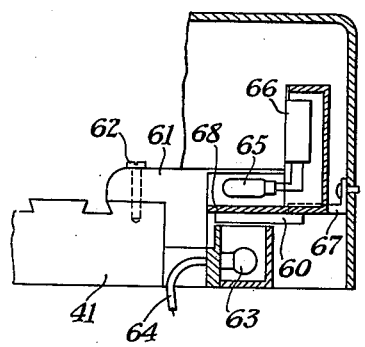
FIG. 6.
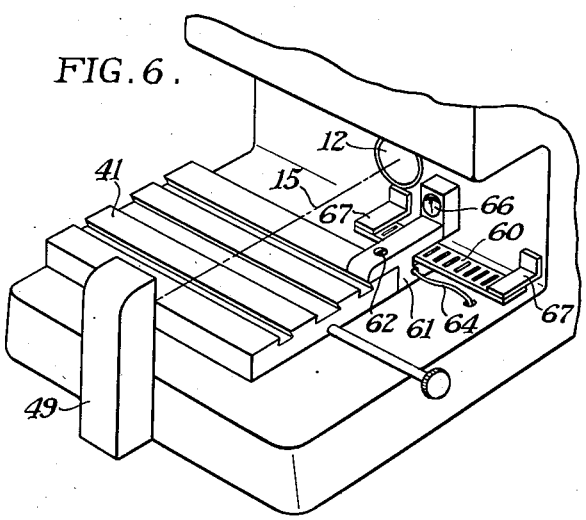
FIG. 11.
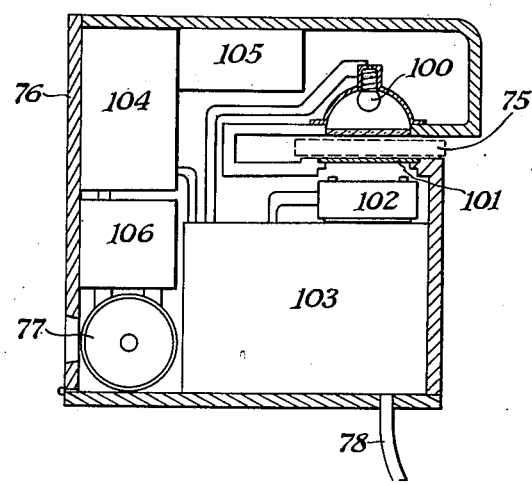
ALLEN R. FULTZ
INVENTOR
Daniel I. Mayne
BY F. M. Emerson Holm
ATTORNEYS April 8, 1952 A. R. FULTZ 2,592,264
CONTOUR PROJECTOR
Filed April 8, 1950 3 Sheets-Sheet 3
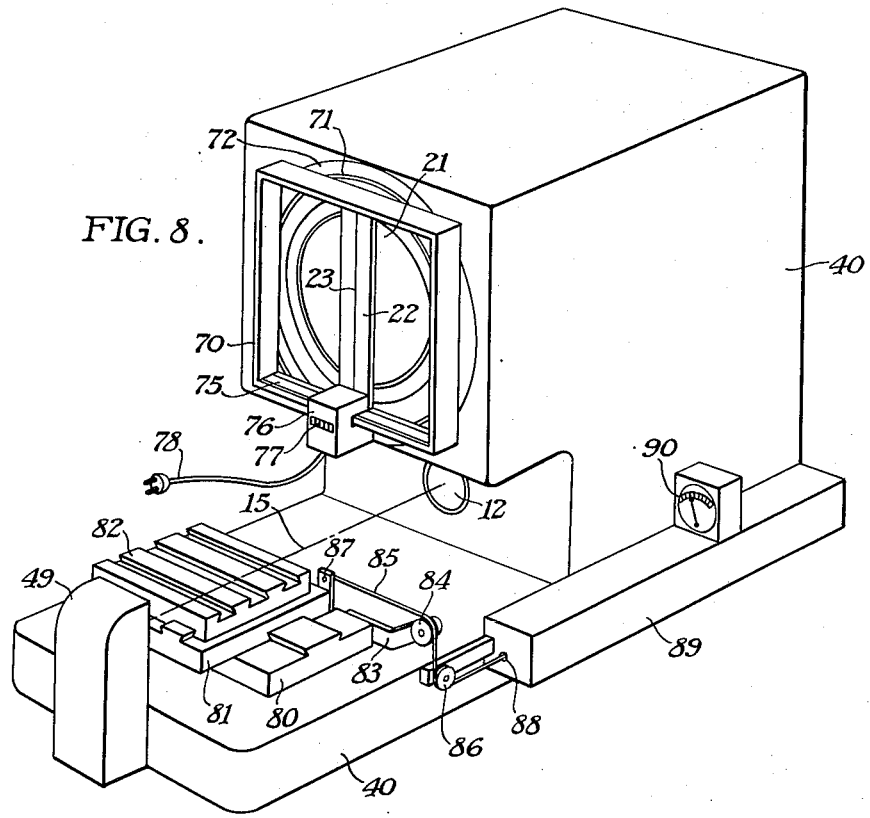
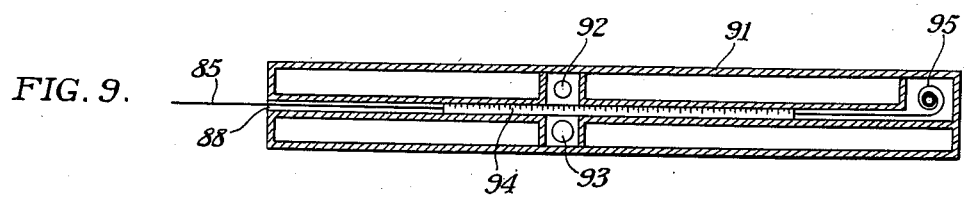
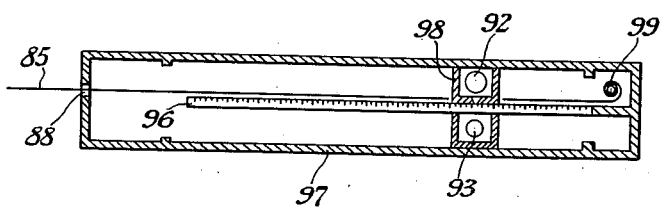
ALLEN R. FULTZ
INVENTOR
BY
ATTORNEYS Patented Apr. 8, 1952

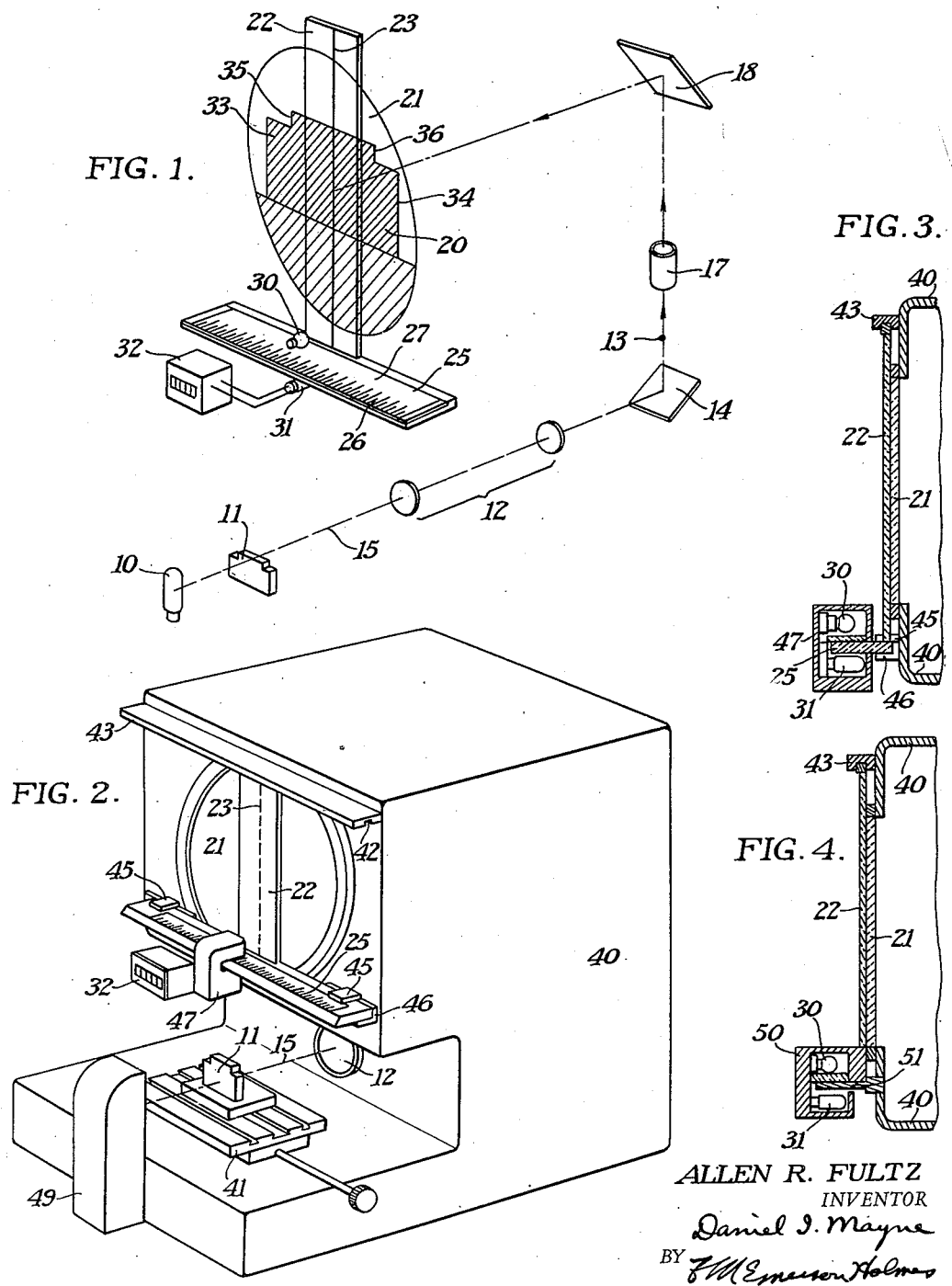

2,592,264

UNITED STATES PATENT OFFICE 2,592,264

CONTOUR PROJECTOR

Allen R. Fultz, Rochester, N. Y., assignor to Eastman Kodak Company, Rochester, N. Y., a corporation of New Jersey Application April 8, 1950, Serial No. 154,781

3 Claims. (Cl. 88—24)

This invention relates to optical systems such as used in machine shops for the projection of a greatly enlarged image of a tool or workpiece.

The present invention is not concerned particularly with the type of contour projector, but relates to an attachment or modification applicable to any contour projector system in which an enlarged image of an object is projected onto a translucent screen.

It is an object of the present invention to provide means for conveniently and accurately measuring the dimensions of an object. Most contour projectors merely compare an object with a standard chart. The present invention measures the size of the object in inches or centimeters and does so with extreme accuracy.

It is an object of a preferred embodiment of the invention to provide means for making such measurements on objects which are so large that a complete image thereof, at the magnification required for the accuracy desired, would more than fill the screen of the contour projector. This preferred embodiment involves measurements both at the object and at the image thereof on the screen and involves movement of the object relative to the optical system of the contour projector. One special embodiment of the invention permits the movement of the object to be in either of two directions transverse to the optic axis of the system and employs a single device for measuring either of the movements.

According to the invention a fiducial line is positioned immediately adjacent to the screen and is carried by a member which is slidably adjustable along the screen in a direction at right angles to the line. This permits the line to be moved and matched with any desired point of the image. For example, the fiducial line is lined up with one edge of the image and is then moved (measurements being made photoelectrically as described below) to the other edge of the image to measure the width of the image. Since the image is greatly magnified relative to the object, this system provides a highly precise measurement.

The measuring device consists of two elements, a scale and a photoelectric cell for reading the scale. Either element may be fixed relative to the screen and the other one moved strictly in accordance with the movement of the fiducial line over the image. The scale is a light transmitting one with transparent marks on an opaque ground or opaque marks on a transparent ground or more generally has markings and background of different optical densities. The photoelectric cell receives light only through the scale and produces current impulses corresponding to the markings as the scale moves over the cell or viceversa. A mask is usually provided in front of the cell to confine the light reaching the cell to a narrow slit whose width is approximately the same as that of the markings on the scale. In this case where it is merely necessary to count the markings as they move past, there does not have to be a one to one relationship between the width of the markings and the width of the slit but of course the slit should not be large enough to cover two of the markings and should not be much narrower than the single marking since this would reduce the light reaching the cell unnecessarily. Daylight may be used to provide illumination but I prefer a lamp carried by the cell mounting but on the other side of the scale to send light through the scale to the cell. The masking slit may be in front of either the cell or the lamp or a slit may be positioned in front of each of them. An electric impulse counter is coupled to the output of the cell usually with one or more stages of amplification to count the number of pulses received. In the simple example discussed above, the fiducial line is placed at one edge of the image and the reading of the counter is set to zero or is noted. The fiducial line is then moved across the image to the other edge and the counter reading then gives the exact width of the object in units depending on the magnification of the system and the spacing of the markings on the scale. For example it is quite convenient to have the counter read the object width directly in mils or tenths of mils.

Since the accuracy of the instrument depends on the degree of magnification of the image it is desirable to use high magnifications even up to 100 times in some cases. However this would mean that an object six inches across would require a screen 50 feet in diameter which is quite impractical. In a preferred embodiment of the invention, this difficulty is overcome by placing the object on the contour projector table with one edge imaged on the screen. A second measuring device associated with the table is so arranged that it permits the table to be positioned accurately to a ten-thousandth of an inch for a plurality of settings some definite distance apart say one-tenth of an inch or even one inch apart. The table and object are positioned accurately at one of these settings and then the fiducial line at the screen is positioned opposite one edge of the image. The object table is then adjusted transversely to the optic axis of the system moving the object very accurately through a distance of say 6.0000 inches, bringing the other edge of the image into view on the screen, in general at some distance from the fiducial line. The fiducial line is then moved and the adjustment thereof counted in ten thousandths of an inch which value is added to or subtracted from the 6.0000 inches depending on which way the fiducial line was moved.

The second measuring device is similar to the first in that it consists of a scale with markings and background of different optical densities and a photoelectric cell receiving light only through the scale. The markings are very accurately spaced but are a relatively large distance such as a tenth of an inch apart. Also it is not necessary to count the marks automatically, but it is very necessary to position the cell relative to the scale or vice-versa, very accurately on the middle of a mark before the table is adjusted and again at the end of the adjustment. The output of the photoelectric cell is connected to a meter or other device which indicates the maxima and minima in the current values and the setting on any one mark is made in accordance with these maxima or minima. If the mask associated with the cell or light source or both, in this case, has a slit whose width is exactly equal to that of opaque markings, precise setting of the measuring device is indicated by zero output from the cell. In this case the mask should not be narrower than the opaque markings. The same is true in the case where the markings are transparent and maximum current represents correct setting. The mask can be slightly wider than the markings but this tends to broaden the maxima and minima which reduces the ease of setting the table both before and after movement.

The fiducial line at the screen is, in one embodiment, mounted in a frame rotatable around the screen so that the fiducial line can be moved in any direction along the image. In general it is not feasible to move the object in any and all directions transverse to the optic axis, but most contour projectors are provided with a table including at least two relatively adjustable parts. In general a third movement longitudinally of the optic axis is also provided but such movement is not of interest here. The two relatively adjustable parts of the table are each separately adjustable to move the object transversely to the optic axis in two directions at right angles to each other. For example in a horizontal projection system, the objest may be adjusted sideways or up and down. In one preferred embodiment of the invention, the measuring device associated with the setting of the table is coupled to and operated by both parts of the adjusting means. In general one of the adjustments remains fixed and this measuring device merely operates according to the other adjustment, but either may be selected at will.

Other objects and advantages of the invention will be apparent from the following description when read in connection with the accompanying drawings in which:

Fig. 1 is a schematic perspective view of the optical system of a simple embodiment of the invention.

Fig. 2 is a perspective view of this embodiment.

Figs. 3 and 4 are vertical sections of alternative arrangements of one feature of this embodiment.

Fig. 5 is a greatly magnified view of one detail of the embodiment.

Fig. 6 is a perspective view of a feature of the invention which may be combined with the embodiment shown in Figs. 1 to 5.

Fig. 7 is a vertical section of one detail of the feature shown in Fig. 6.

Fig. 8 is a perspective view of another embodiment of the invention.

Figs. 9 and 10 are vertical sections of alternative arrangements for one detail of Fig. 8.

Fig. 11 is a vertical section of another detail of Fig. 8.

In Fig. 1 light from a lamp 10 illuminates the profile of a test object 11. An afocal lens 12 consisting of two positive lenses of equal focal length separated by the sum of their focal lengths forms an image of the object at the point 13, after reflection of the light vertically upward by a mirror 14. Although the optic axis 15 of the system is bent by the mirror 14 it is horizontal at the object 11. The image at the point 13 is relayed and greatly magnified by an objective 17 to form, after reflection at a second mirror 18, an image 20 on a translucent screen 21. According to the invention a member 22 made of glass, carries a fiducial line 23 immediately adjacent to the image 20 and screen 21. The member 22 is fastened to a scale 25 and both are movable, in guides, not shown in Fig. 1, in a direction at right angles to the fiducial line 23. That is, the fiducial line 23 may be moved from one side to the other of the image 20.

The scale 25 is provided with markings 26 and background 27 of different optical densities. As the scale moves under a lamp 30, a photoelectric cell 31 receives light from the lamp through the scale 25. The output of the photoelectric cell 31 consists of a series of electric pulses corresponding to the markings 26 as the scale moves past the cell. An electrically operated counter 32 is connected to the output of the cell and counts the pulses. Thus as the line 23 is moved from the edge 33 to the edge 34 or from the point 35 to the point 36 on the image 20, the counter 32 indicates the extent of this movement. If the markings 26 are spaced one hundredth of an inch apart, the width of the image is measured to a hundredth of an inch and if the magnification due to the lens 17 is 100X, the width of the object 11 is measured to the nearest ten thousandths of an inch as indicated by the counter 32.

In Fig. 2 a standard form of contour projector 40 is provided with the present invention in the form of an attachment. The object 11 in this case is carried on a table 41 which is adjustable in three dimensions in known manner. The member 22 is supported so that the upper end slides in a groove 42 in a bar 43 attached to the projector casing 40. The scale 25 moves with the member 22 and slides between guides 45 and 46 also fastened to the housing of the projector 40. The lamp and photoelectric cell are mounted in a housing 47 immediately adjacent to the counter 32 and both are mounted on the housing 40. In Fig. 2 the wire running from the lamp and cell unit to an electric source is not shown, since it may be connected inside the housing to the regular wiring system which supplies current to the lamp in the housing 49.

Fig. 3 shows a vertical section of certain of the elements shown in Fig. 2.

Fig. 4 similarly shows a slightly different arrangement in which the member 22 is attached to the housing 50 for the lamp 30 and cell 31 so that the lamp and cell move over the scale 51 which in this case is fixed relative to the screen 21 by being fastened directly to the housing 40.

Fig. 5 is a greatly enlarged view of one form of scale and a mask for selecting the markings on the scale. In Fig. 5 the markings 52 are transparent on an opaque background 53. A glass plate 54 is provided with an opaque coating 55 in which a transparent slit 56 has been engraved or etched in any of the manners common to the making of reticles. This mask is held immediately adjacent to the scale and moves relative thereto along the scale. It does not matter whether the lamp is above the scale and the photoelectric cell below or vice-versa and, the mask 55 may be considered in front of either the lamp or the cell, or two such masks may be used although only one of them will be strictly effective because the thickness of the glass plate 57 on which the scale is mounted permits only one mask to be immediately adjacent to the scale 53.

Thus the primary feature of the invention has to do with the photoelectric measurements made at the screen of a contour projector. It sometimes happens however that the object is so large and the magnification so high, that the image is many times larger than the screen. The attachment shown in Fig. 6 permits measurements to be made in this case. That is, Fig. 6 is part of an embodiment of the invention, the remainder of which is identical to Fig. 2 but it is not shown in Fig. 6 since it would only confuse the issue. In Fig. 6 the table 41 is adjustable transversely relative to the optic axis 15 of the contour projector. A scale 60 is attached to the housing 40 of the projector and thus remains fixed relative to the optic axis 15. A photoelectric unit comprising a housing 61 is attached by screw 62 to the table 41. The details of this unit appear more clearly in the cross section shown in Fig. 7. A lamp 63 which may be powered by a simple flashlight battery or through an electric cord 64 is positioned below the scale 60 and sends light through the scale to a photoelectric cell 65 which is connected directly to operate an ammeter 66 which is carried along with the unit 61. The clamps 67 for holding the scale 60 are shown in both Fig. 6 and Fig. 7. As the photoelectric unit moves over the scale 60, the output of the cell 65 as indicated by the ammeter 66 varies between maxima and minima corresponding to the markings and background of the scale 60. These markings are accurately engraved one-tenth of an inch apart and in the arrangement shown the markings are opaque on a transparent background which means that the markings correspond to minima in the ammeter readings. The mask 68 in front of the cell 65 and in contact with the scale 60, has a slit which is exactly the same width as the opaque markings on the scale 60. Thus when the photoelectric unit is accurately set on one of the markings, the meter 66 registers zero.

The operation of the device consists in setting the unit 61 accurately on one of the markings in the scale 60 and then moving the fiducial line 23 to one edge of the image. The table 41 is then moved transversely to the optic axis 15 to bring the other edge of the image into view on the screen, carefully counting the number of markings which pass the photoelectric cell 65, and the adjustment of the table 41 is continued until the photoelectric unit is accurately set on another of the markings on the scale 60. The object has then been moved accurately through an integral number of tenths of an inch. The line 23 is then moved along the image to the edge to be measured and the adjustment of the line in terms of the dimensions of the object is added to or subtracted from the number of tenths of an inch through which the object itself was moved. Instead of carefully counting the tenths of an inch the pulses from the photoelectric cell may be fed to the counter (e. g. 32) which counts the thousandths of an inch, to operate the counter wheel which shows the tenths and units.

The arrangement shown in Fig. 8 is of more general utility in that measurements of any transverse dimension of the object may be made without shifting the object itself. In order to accomplish this the movable member 22 carrying the fiducial line 23 is mounted in a rectangular frame 70 which in turn is mounted on a circular plate 72 provided with a groove 71 so that the whole frame 70 is rotatable about the center of the screen 21. The scale is incorporated in the side 75 of the frame 70. In the figure this side 75 is the lower side but of course the frame 70 is rotatable so that the side 75 may be horizontal, vertical or obliquely oriented. The photocell unit 76 with built-in counter 77 in this case is mounted to slide on the scale 75. Power is provided through a wire 78 which may be spring held to keep it out of the way of the optical system but still to permit full freedom of motion of the unit 76 along the scale 75 and full freedom of rotation of the frame 70. With this arrangement, the dimensions may be measured horizontally, vertically or at any desired angle on the screen 21.

The arrangement shown in Figure 8 is also provided with a work support table consisting of three sections 80, 81 and 82. The section 80 is mounted on a jack (not shown) to permit vertical motion. This motion is transverse in one dimension to the optic axis 15 of the projector. Mounted on table section 80 is a second section 81 which is adjustable horizontally, in a direction also transverse to the optic axis 15. On top of this, is a third section 82 of the table which is adjustable longitudinally to the optic axis, for focusing. The table 80 carries an arm 83 and pulley 84 both of which move vertically with the table 80 and produce an equivalent motion of a cord 85 which passes over a lower pulley 86 which is fixed relative to the body 40 of the contour projector. This cord 85 is attached by stud 87 to the horizontally adjustable table 81. Adjustment of the table 81 also moves the cord 85 over the pulley 86. This cord 85 passes through an opening 88 in a photocell unit 89 to adjust a scale and photocell relative to each other in the same way as scale 60 and cell unit 61 of Fig. 6 are operated relative to one another. The maxima and minima of the cell output in the unit 89 is indicated on an ammeter 90. As in the case of Fig. 6, the vertical adjustment of the table 80 or the horizontal adjustment of the table section 81 is made between two accurate settings of the scale and cell unit 89, as indicated by maxima or minima on the ammeter 90. In regular use, either the section 80 or the section 81 is held stationary while the other one is moved so that only one adjustment is recorded or controlled by the unit 89. If both parts are moved, it is not possible to distinguish which motion produced which part of the total change as indicated by the unit 89. In practice of course only one dimension is measured at a time so that this difficulty is automatically avoided.

Figs. 9 and 10 show alternative arrangements of the unit 89. In Fig. 9 the housing 91 contains a photocell 92 and a lamp 93 rigidly positioned relative to the housing 91. The cord 85 through the hole 88 engages the end of a light transmitting scale 94, the other end of which is held by a spring 95. That is, the cord 85 pulls the scale 94 against the force of a spring 95 which in turn moves the scale in the other direction whenever tension on the cord 85 is reduced. In Fig. 10 the scale 96 is held rigidly with respect to the housing 97 and the cord 85 engages housing 98 of the photocell 92, lamp 93, unit and moves this unit over the scale 96 against the action of a spring 99. In this case electrical connections to the photocell unit are provided by a cord long enough to permit full motion of the photocell unit along the scale 96. The unit shown in Fig. 9 has the advantage of the photocell and lamp being fixed so that no electric leads have to be moved and also it is sometimes simpler to adjust a scale accurately rather than the cell unit. However, the arrangement shown in Fig. 10 is only about half as long as that shown in Fig. 9.

The unit 76 is shown greatly enlarged in Fig. 11 in which light from a small lamp 100 passes through the scale 75, shown in broken lines in this Fig. 11, then through a slit in an otherwise opaque mask 101 to energize a photocell 102. Current for the amplifying system made up of units 103, 104 and 105 is provided through the cord 78 as is also the current for the lamp 100. The mechanical counter 77 is electrically operated by its control unit shown at 106. The present invention is not concerned with the particular type of photoelectric cell used or the type of amplifier or the type of pulse counter energized by the amplifier. It is concerned primarily with the combination of a photoelectric scale counter and a fiducial line cooperating with the screen of a contour projector.

The invention is of the scope of the appended claims.

I claim:

1. A contour projector system comprising a translucent screen, means for projecting an enlarged image of an object onto said screen, a fiducial line carried by a member immediately adjacent to said screen, means for holding said member slidably adjustable along said screen in a direction at right angles to the line, a two-element measuring device, one element being a light transmitting scale with markings and background of different optical densities and the other element including a photoelectric cell receiving light only through the scale and producing electric pulses corresponding to the markings as one element moves past the other, means for holding one of said elements fixed relative to the screen, means for moving the other element strictly in accordance with the movement of said member along said screen and an electric pulse counter connected to and operated by said cell.

2. A contour projector system according to claim 1 including a table for supporting the object, means for adjusting said table transversely to the optic axis, at the object, of the projecting means, a second two-element measuring device, one element being a light transmitting scale with markings and background of different optical densities and the other element including a photoelectric cell receiving light only through the scale and producing a current which varies between maxima and minima extremes as one element moves past the other, means for holding one of said elements fixed relative to the optic axis, means for moving the other element strictly in accordance with the transverse adjustment of said table and means for indicating the current extremes corresponding to said markings.

3. A contour projector system according to claim 2 in which the table includes two relatively adjustable parts, one carried by the other, the adjusting means consists of two parts respectively for adjusting the parts of the table transverse to the optic axis in directions at right angles to each other and said last mentioned moving means being coupled to and operated by both of the parts of the adjusting means.

ALLEN R. FULTZ.

REFERENCES CITED

The following references are of record in the file of this patent:

UNITED STATES PATENTS

| Number | Name | Date |
|---|---|---|
| 2,351,337 | Houston | June 13, 1944 |
| 2,414,871 | Harper | Jan. 8, 1947 |
| 2,422,611 | Becker | June 17, 1947 |